(12) United States Patent
Grozinger

(10) Patent No.: US 8,272,263 B2
(45) Date of Patent: Sep. 25, 2012

(54) DEVICE FOR DETERMINING AND/OR MONITORING THE FILING LEVEL OF A MEDIUM

(75) Inventor: Roland Grozinger, Staufen (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 438 days.

(21) Appl. No.: 12/311,241

(22) PCT Filed: Oct. 2, 2007

(86) PCT No.: PCT/EP2007/060482
§ 371 (c)(1),
(2), (4) Date: Oct. 30, 2009

(87) PCT Pub. No.: WO2008/040745
PCT Pub. Date: Apr. 10, 2008

(65) Prior Publication Data
US 2010/0147069 A1    Jun. 17, 2010

(30) Foreign Application Priority Data
Oct. 6, 2006    (DE) .......................... 10 2006 047 814

(51) Int. Cl.
*G01F 23/296* (2006.01)

(52) U.S. Cl. .................................................... 73/290 V

(58) Field of Classification Search ................. 73/290 V
See application file for complete search history.

(56) References Cited

U.S. PATENT DOCUMENTS

| | | |
|---|---|---|
| 4,182,177 A | 1/1980 | Prough |
| 4,523,472 A | 6/1985 | Blades |
| 4,785,664 A | 11/1988 | Reebs |
| 5,124,933 A | 6/1992 | Maier |
| 5,437,178 A | 8/1995 | Esin |
| 5,768,939 A | 6/1998 | Quayle |
| 6,051,895 A * | 4/2000 | Mercier ........................ 307/125 |

FOREIGN PATENT DOCUMENTS

| | | |
|---|---|---|
| DE | 68918328 | 4/1995 |
| EP | 0 342 757 | 11/1989 |
| EP | 0 813 044 | 12/1997 |
| GB | 1 322 094 | 7/1973 |
| WO | WO 02/06774 | 1/2002 |

* cited by examiner

*Primary Examiner* — David Rogers
*Assistant Examiner* — Paul West
(74) *Attorney, Agent, or Firm* — Bacon & Thomas, PLLC

(57) ABSTRACT

An apparatus for ascertaining and/or monitoring fill level of a medium, having piezoelectric sensors for producing and receiving ultrasonic signals, relates to a scanning circuit, which provides, for each piezoelectric sensor to be driven, at least one exciter switching circuit for selective driving of the selected piezoelectric sensor.

9 Claims, 2 Drawing Sheets

DEVICE FOR DETERMINING AND/OR MONITORING THE FILING LEVEL OF A MEDIUM

TECHNICAL FIELD

The invention relates to an apparatus for ascertaining and/or monitoring the fill level of a medium. The apparatus includes: piezoelectric sensors for producing and receiving ultrasonic signals; a scanning circuit for selective evaluation and selective driving of a plurality of piezoelectric sensors by means of at least one measurement transmitter; and a signal evaluating unit in the measurement transmitter, which ascertains from the ultrasonic signals, on the basis of the travel time measuring method, the fill level of the medium.

BACKGROUND DISCUSSION

The fill level of a medium in a tank can be ascertained, for example, by transmitting ultrasonic, pulse signals from a sensor and detecting the pulse signals reflected on the surface of the medium by the sensor. Ultrasonic measuring devices for distance ascertainment are composed, in the usual case, of: a sensor for signal production and receipt; and a measurement transmitter for signal evaluation and data transmission. The travel time ascertained by the measurement transmitter is a characterizing measure for the traveled path of the pulse signals from the sensor to the surface of the medium. The fill level of the medium in the tank is ascertained by subtracting the one-way, traveled path of the pulse signals from the total tank height. Corresponding fill level measuring devices are available from the Endress+Hauser under the mark "Prosonic". Such sound, or ultrasonic, sensors for fill level measurement are applied in many branches of industry, e.g. in the foods industry, water, and wastewater, management, and in the chemical industry.

For producing the ultrasonic pulses, a piezotransducer, or a piezoelectric element, is excited with an alternating voltage, in order to cause it to oscillate. The frequency of the oscillation depends only on the velocity of sound, as a constant of the material, and on the dimensions, of the piezoelectric body. Problematic, in such case is that, most often, a heavy, large-volume transformer dimensioned for the needed pulse power is required for this.

In German Offenlegungsschrift DE 1020040208951, a simple driving of a piezotransducer is disclosed, wherein no transformer is used.

In order to reduce effort and cost per measuring point, a certain number of sensors are operated and evaluated using only a single measurement transmitter. For this, a so-called scanning circuit, or scanner, is applied, which selectively produces an electrical connection between the individual sensors and the measurement transmitter. Such scanning circuits have, as a rule, a number of relays, which are so operated by the evaluating circuit of the measurement transmitter, that the switch contacts of the relay selectively connect the sensors with the evaluating circuit and the exciter switching circuit. Such a construction is shown and described in FIG. 1.

The disadvantages of such mechanical scanning circuits arise from the fact that the switch contacts, as mechanically moving components, normally can experience only a limited number of switching cycles and often present contact problems in the form of increased contact resistance at the contact surfaces of the switch contacts, which, above all, in the case of received signals in the microvolt range, leads to problems. In order to avoid these disadvantages, U.S. Pat. No. 6,051,891 A1 discloses an electronic scanning circuit. In the disclosed electronic scanning circuit, the relay contacts are replaced by a MOSFET transistors circuit. Disadvantageous in the case of this electronic scanning circuit is that the driving of the electronic scanning circuit is difficult. In such case, always two, series connected, MOSFET transistors are needed to form one electronic switch contact. This circuit construction has also the disadvantage that, for driving the two transistors, a great circuit-technical effort must be tolerated, since the two MOSFET transistors have no common, fixed reference potential for driving them. The circuit construction is, as a result, complicated—the more so, since the electronic scanning circuit with the two MOSFET transistors must be so designed, that both the exciter signal with a high electrical current and a high voltage can be transferred from the exciter switching circuit to the sensor, as well as also low returned signals received from the sensor, without losses, for processing by the evaluating circuit.

SUMMARY OF THE INVENTION

An object of the invention is to provide an electronic scanning circuit for ultrasonic sensors, wherein the electronic scanning circuit has a simple, compact and cost effective, circuit construction.

The invention achieves this object by providing in the scanning circuit, for each piezoelectric sensor to be operated, at least one exciter switching circuit for selectively driving a selected piezoelectric sensor for producing ultrasonic signals.

In an especially preferred form of embodiment of the invention, it is provided, that at least a first selection unit is provided in the scanning circuit for operating and/or controlling an exciter switching circuit selected via a selection input.

In an advantageous form of embodiment of the solution of the invention, it is provided that, in each exciter switching circuit, at least two switch elements are provided, which on the basis of control by the first selection unit, switch mutually opposite and/or different potentials sequentially to the selected piezoelectric sensor.

A purpose-supporting embodiment of the apparatus of the invention is that in which electrically or optically controllable transistors are provided in the exciter switching circuits as switch elements.

In an embodiment of the apparatus of the invention, it is provided, that at least a second selection unit is provided in the scanning circuit for sequentially, selectively or cyclically, electrically connecting, via each activated selection input of the piezoelectric sensors, with an evaluation unit via a receiving path.

In an especially preferred form of embodiment of the invention, it is provided that, for protecting the second selection unit, a limiting circuit is provided for limiting the maximal voltage in the receiving path.

In the case of an advantageous embodiment of the solution of the invention, a digital demultiplexer is provided as first selection unit.

A preferred variant of the solution of the invention is that in which an analog multiplexer is provided as second selection unit.

An especially advantageous, further development of the solution of the invention provides, that the selection inputs of the first selection unit and second selection unit are switched in parallel and a control/evaluation unit activates all selection inputs with a same selection address.

In a useful embodiment of the apparatus of the invention, it is provided, that a temperature measuring, sensor ascertaining unit is provided in the measurement transmitter for ascertaining sensor temperature and sensor type via an identification path.

A suitable embodiment of the apparatus of the invention is that in which the signal evaluating unit, the operating unit and/or temperature measuring, sensor ascertaining unit are/is embodied as an integral component of the control/evaluating unit.

BRIEF DESCRIPTION OF THE DRAWINGS

The invention and a selected example of an embodiment will now be explained in greater detail on the basis of the appended drawings. For simplification in the drawings, identical parts have been provided with identical reference characters, which, however, are only repeated in subsequent figures, when such is useful. The figures of the drawings show as follows.

DETAILED DISCUSSION IN CONJUNCTION WITH THE DRAWINGS

Figure 1:
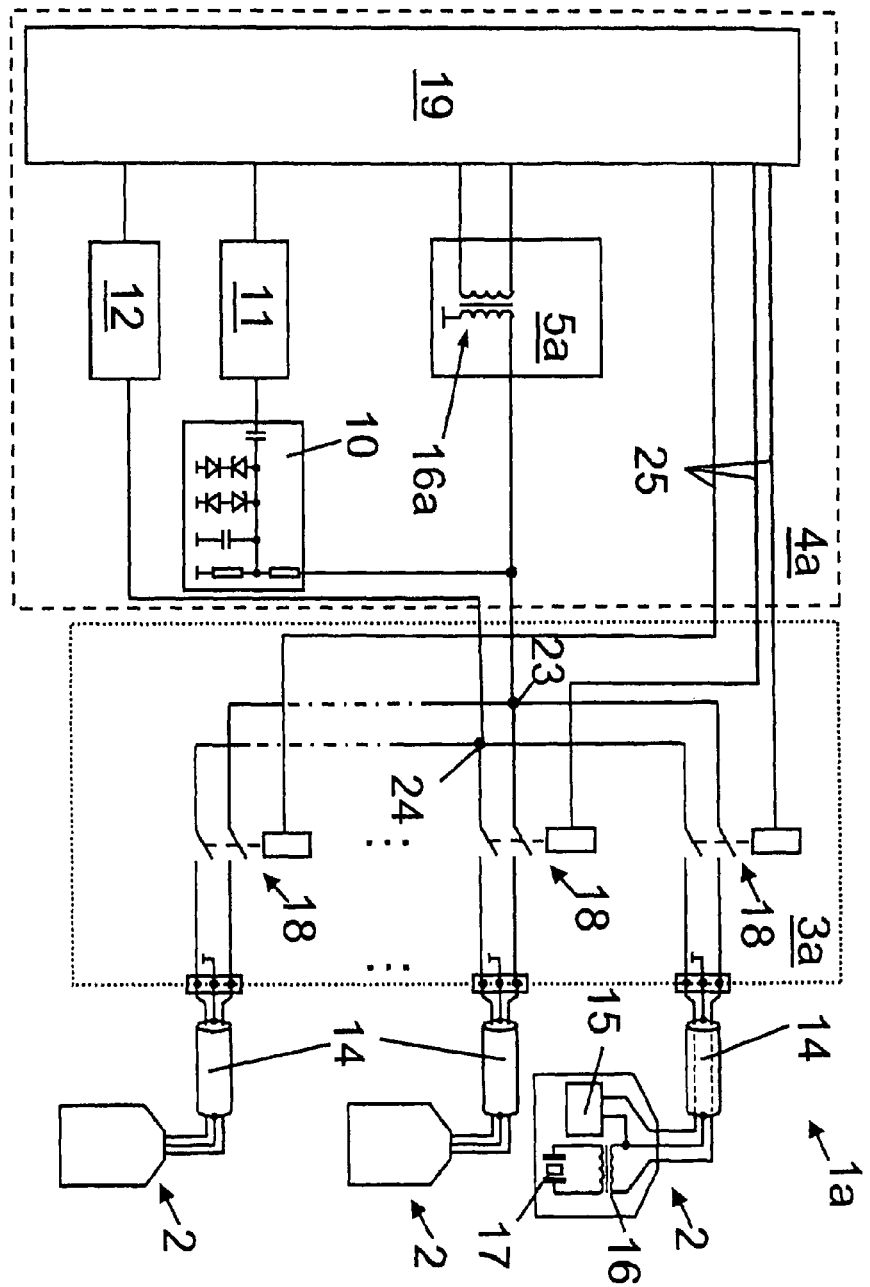
FIG. 1 is a schematic circuit diagram for driving a plurality of piezoelectric sensors using a scanning circuit according to the state of the art.

The circuit diagram shown in FIG. 1 illustrates the circuit construction of an ultrasonic measuring system of the state of the art. It includes a measurement transmitter 4a and a plurality of piezoelectric sensors 2, which are connectable, via a scanning circuit 3a using mechanical relays 18, selectively with the exciter switching circuit 5a, the signal evaluating unit 11 and/or the temperature measuring, sensor ascertaining unit 12. In the case of this example of an embodiment, the scanning circuit 3a includes, for each connected piezoelectric sensor 2, at least one mechanical relay 18 having two, simultaneously switched, switch contacts. The scanning circuit 3a is embodied, in the case of this embodiment, in the form of a so-called relay card. The inputs of the first switch contact of each relay 18 are connected in parallel with one another and with the exciter switching circuit 5a and the limiting circuit 10 followed by the signal evaluating unit 11 of the measurement transmitter 4a via a single, first, electrical measurement line 23. Furthermore, the inputs of the second switch contact of each relay 18 are connected in parallel with one another and with the temperature measuring, sensor ascertaining unit 12 for ascertaining the type of the piezoelectric sensor 2 or the temperature of the medium via a second electrical measurement line 24. Each relay 18 in the scanning circuit 3a is operated via separate control line 25 from the control unit 19. When a voltage exists on the coil of a relay 18, the associated switch contacts of the relay 18 are closed.

A measuring cycle of the apparatus 1a of the state of the art will now be explained in greater detail: The control unit 19 places via a corresponding control line 25 a certain voltage on the coil of a particular relay 18 in the scanning circuit 3a, whereupon the switch contacts of this relay 18 are closed. Simultaneously, the control unit 19 causes the exciter switching circuit 5a to release an exciter signal, e.g. an alternating voltage of rectangular or sinusoidal waveform, via the first measurement line 23, to the corresponding piezoelectric sensor 2. The order of magnitude of the voltage values of the exciter signal lies, in such case, in the range of 10 to 100 volt, e.g. 50 volt. A transformer 16b integrated in the piezoelectric sensor 2 steps up this exciter signal to a voltage of some hundreds of volts, before it excites the piezotransducer 17 for a short time to produce resonant oscillations. The thus produced, ultrasonic, pulse signal is radiated in the direction of the medium with a certain radiation characteristic. Following a travel time dependent on the traveled path, the reflected fractions of the ultrasonic, pulse signal are received back by the piezotransducer 17. These reflected ultrasonic signals are converted in the piezotransducer 17 into an electrical, received signal, which is transmitted via the first measurement line 23 and a limiting circuit 10 to the signal evaluating unit 11. The limiting circuit 10 limits the voltage of the exciter signal to a level tolerable for the measuring electronics of the signal evaluating unit 11. The orders of magnitude smaller, received signal is scarcely or only slightly influenced by the limiting circuit 10. From the knowledge of the point in time of production and the point in time of reception of the ultrasonic, pulse signal, the travel time is ascertained. On the basis of the amount of time, or travel time, between the transmitting of the ultrasonic, pulse signals and the receipt of the reflected, echo signals, taking into consideration the propagation velocity of the pulse signal, the distance from the piezoelectric sensor 2 to the surface of the medium is ascertained. Taking into consideration the geometry of the container interior, then the fill level of the medium is ascertained as a relative or absolute quantity.

Due to the temperature dependence of the propagation velocity of ultrasonic signals and the dependence on sensor type, the applied piezoelectric sensor 2 is exactly identified and the current temperature of the gas phase located over the medium is exactly ascertained in the piezoelectric sensor 2 by means of a temperature sensor/sensor identifier 15. This has the advantage that the control/evaluation unit 19 can compensate for signal changes in the measurement signal based on temperature changes of the process, and changes of the sensor type are automatically detected. The temperature sensor/sensor identifier 15 is, most often, embodied in the form of a temperature dependent resistor, e.g. a PT100.

As already earlier mentioned, a disadvantage of such mechanically constructed, scanning circuits 3a is that the mechanically moved components on the relay 18 have, due to wear, only a limited life expectancy. For this reason, the relay 18 in the scanning circuit 3a must be replaced after a certain operating time. Furthermore, it is possible, that, because of switch contact problems, for example, in the form of an increased contact resistance on the switch contacts of the relay 18, the received signals in the microvolt region can no longer be transmitted by the switch contacts loss-free, and, thus, the received signal, in the worst case, can no longer be evaluated and/or registered by the signal evaluating unit 11.

A further disadvantage of this known embodiment of a scanning circuit 3a in FIG. 1 is that, based on technical conditions of the process, most often, long lines between the measurement transmitter 4a or the piezoelectric sensor 2 and the scanning circuit 3 must be installed, over which the pulse power of the exciter switching circuit 5a must be transferred. In order that no large losses of the exciter signal of the exciter switching circuit 5a be experienced on the line distances between the measurement transmitter 4a and the scanning circuit 3a, these lines and the exciter switching circuit 5a must be correspondingly amply dimensioned, e.g. in the form of a heavy, large-volume transformer 16a dimensioned for the required pulse power.

Figure 2:
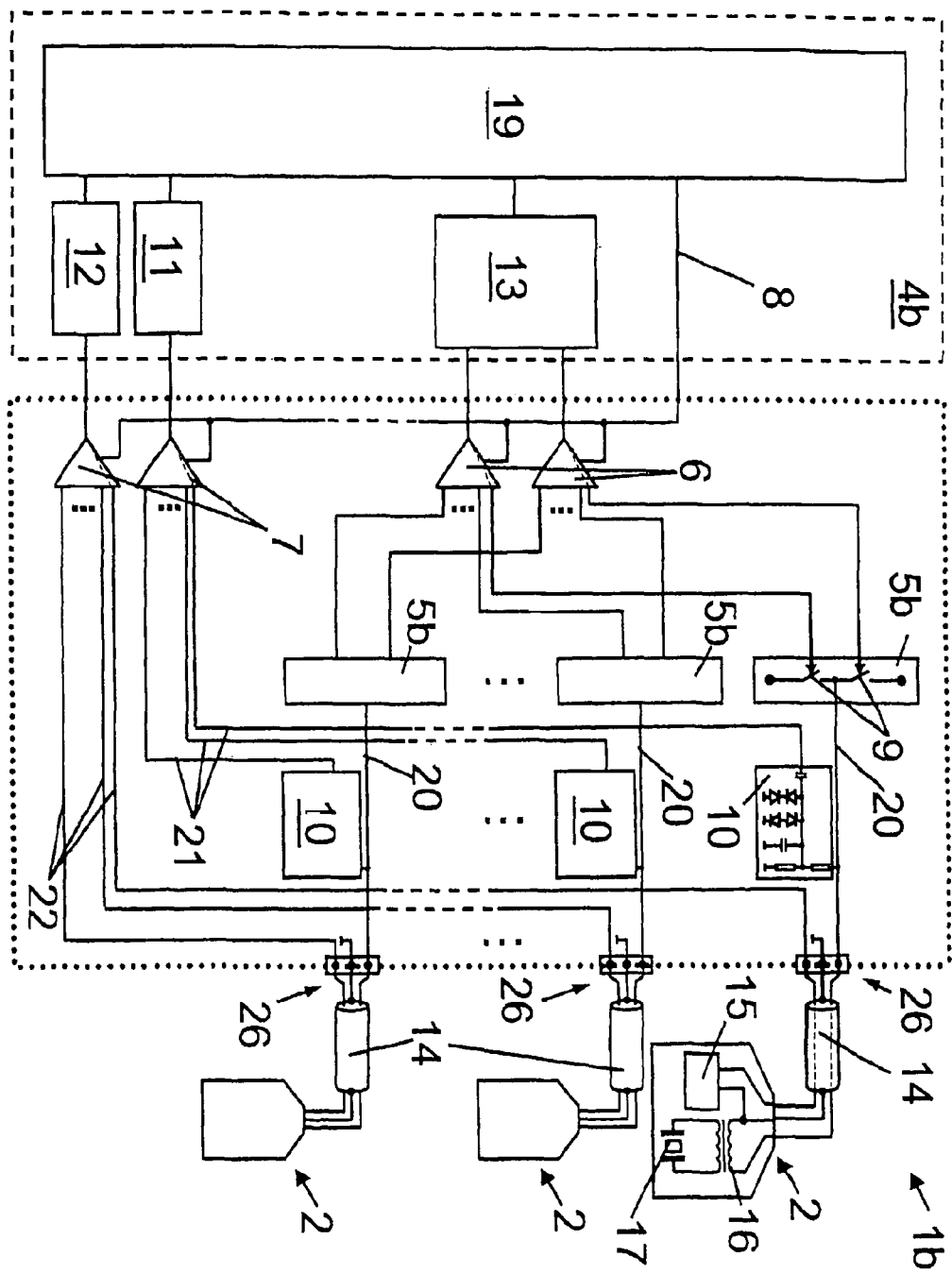
FIG. 2 is a schematic circuit diagram for driving a plurality of piezoelectric sensors using a scanning circuit according to the solution of the invention.

FIG. 2 shows the construction of the invention of the apparatus 1b for selective driving and evaluation of piezoelectric sensors 2. The apparatus 1b includes a scanning circuit 3b with an exciter switching circuit 5b for each output, to which a piezoelectric sensor 2 can be connected. The piezoelectric sensor 2 is composed, such as already earlier described, of at least one piezotransducer 17, a transformer 16b and a temperature sensor/sensor identifier 15. Via, for example, three-line connecting cables 14, the piezoelectric sensors 2 are connected to their measurement channels 26, composed of a shared driving path 20 and receiving path 21, as well as to their identification paths 22, of the scanning circuit 3b. According to the invention, per measurement channel 26, or per connection, there are provided in the scanning circuit 3b for a piezoelectric sensor 2 an exciter switching circuit 5b and a limiting circuit 10. A further advantage of the scanning circuit 3b of the invention is that, on the basis of the exciter switching circuits 5b and limiting circuits 10 associated with the measurement channels 26 and based on keeping a three-line connection of the sensors 2, also older and/or earlier installed sensors 2 are connectable to the connection terminals.

The exciter switching circuits 5b are embodied, for example, corresponding to the end stages set forth in the German Offenlegungsschrift DE 1020040208951. These exciter switching circuits 5b, or end stages, serve for driving the piezoelectric sensors 2 without a large-volume transformer 16a, whereby this embodiment of the scanning circuit 3b of the invention can be built quite compactly. For the details of this exciter switching circuit 5b in the form of an end stage without transformer 16a, reference is made to the above cited German Offenlegungsschrift DE 1020040208951.

These exciter switching circuits 5b are operated via at least a first selection unit 6, such as e.g. a digital demultiplexer, by the operating unit 13, in the case of which the switch elements 9 of the exciter switching circuit 5b, for example, in the form of a power MOSFET (Metal Oxide Field Effect Transistor) or in the form of a bipolar, power transistor with insulated base electrode (IGBT), are operated in predetermined switching cycles. The transistors of the exciter switching circuit 5b have a fixed reference potential, so that they can be turned on quite easily by the operating unit 13.

The control/evaluation unit 19 integrated in the measurement transmitter 4b controls the operating unit 13 such that it outputs in the desired switching frequency an operating signal, for example, a pulse signal, to the first selection unit 6. The first selection unit 6 forwards these pulse signals to the exciter switching circuit 5b selected by the control unit at the selection input 8 by means of an address. The advantage of this circuit lies also therein, that, up until the activating of a particular exciter switching circuit 5b, everything can occur in the low voltage range and only the application of the exciter signals to the driving path 20 occurs in the high voltage range of some hundreds of volts.

It is also possible to embody the exciter switching circuit 5b by means of power CMOS technology (Complementary Metal Oxide Semiconductor). In this form of embodiment of the invention, which is not explicitly shown in FIG. 2, only a first selection unit 6 is required for selective driving of the exciter switching circuit 5b by the operating unit. However, in this embodiment of the exciter switching circuit 5b in CMOS technology, an element must be provided for preventing cross-conduction currents at the point in time of switching of the complementarily connected n channel and p channel MOSFETs.

The driving path 20 and receiving path 21 are brought, via a shared line of the connecting cable 14, to the transformer 16b of the piezoelectric sensor 2. For this reason, after the splitting of the driving path 20 and the receiving path 21 in the scanning circuit 3b, a limiting circuit 10 is necessary in the receiving path 21 for weakening the exciter signal from the exciter path 20. This limiting circuit 10 is, such as shown by way of example, constructed of a number of diodes, resistors and capacitors. Moreover, the limiting circuit 10 has the job of protecting the following, sensitive electronics, such as e.g. the signal evaluating unit 11, from too high voltage peak values, while, at the same time, letting the reflected, received signal pass almost without attenuation. Via the second selection unit 7, dependent on the address on the selection input 8, the reflected, received signal of the pertinent piezoelectric sensor 2 is placed via the associated limiting circuit 10 on the input of the signal evaluating unit 11 and evaluated by signal processing in the signal evaluating unit 11. Furthermore, the temperature measuring, sensor ascertaining unit 12 ascertains, via the identification path 22 of the temperature sensor/sensor identifier 15, the process temperature for correcting the propagation velocity and the type of the connected piezoelectric sensor 2. The selection of the appropriate receiving path 21 and the corresponding identification path 22 occurs through the operation of the second selection unit 7 via the address of the active measurement channel 26 on the signal input 8.

Another form of embodiment not explicitly shown in FIG. 2 is that wherein the signal evaluating unit 11, the temperature measuring, sensor ascertaining unit 12 and the operating unit 13 are integrated in the control/evaluation unit 19. This integration is, above all, possible, when the control/evaluation unit 19 is formed by a microprocessor having analog signal evaluating components.

The invention claimed is:

1. An apparatus for ascertaining and/or monitoring fill level of a medium, comprising:
   a plurality of piezoelectric sensors for producing and receiving ultrasonic signals;
   a scanning circuit for selective evaluation and selective driving of said plurality of piezoelectric sensors by means of at least one measurement transmitter;
   a signal evaluating unit in said measurement transmitter for ascertaining from the ultrasonic signals, on the basis of a travel time measuring method, the fill level of the medium; and
   at least one exciter switching circuit provided in said scanning circuit for each of said plurality of piezoelectric sensors to be driven, for selective driving of a selected one of said plurality of piezoelectric sensors for producing ultrasonic signals,
   at least a first selection unit is provided in said scanning circuit, which operates and/or controls said exciter switching circuit selected via a selection input to said measurement transmitter; and
   at least a second selection unit is provided in said scanning circuit, which sequentially, selectively or cyclically, electrically connects, via said selection input, said piezoelectric sensors with said signal evaluation unit via a receiving path.

2. The apparatus as claimed in claim 1, wherein:
   there are provided in each said exciter switching circuit at least two switch elements, which are operated by said first selection unit to switch potentials, which are opposite and/or different relative to one another, sequentially onto said selected piezoelectric sensor.

3. The apparatus as claimed in claim 2, wherein:
   said switch elements in said exciter switching circuits comprise electrically or optically controllable transistors.

4. The apparatus as claimed in claim 2, wherein:
   a digital demultiplexer is provided as said first selection unit.

5. The apparatus as claimed in claim 1, wherein:
a limiting circuit is provided for limiting the maximal voltage in said receiving path for protecting said second selection unit.

6. The apparatus as claimed in claim 1, wherein:
an analog multiplexer is provided as said second selection unit.

7. The apparatus as claimed in claim 1, wherein:
said selection inputs of said first selection unit and said second selection unit are connected in parallel; and
a control/evaluation unit operates all said selection inputs with a same selection address.

8. The apparatus as claimed in claim 1, wherein:
there is provided in said measurement transmitter a temperature measuring, sensor ascertaining unit for ascertaining sensor temperature and connected sensor type via an identification path.

9. The apparatus as claimed in claim 1, wherein:
said signal evaluating unit, said operating unit and/or said temperature measuring, sensor ascertaining unit are/is embodied as an integral component of said control/evaluating unit.

\* \* \* \* \*